(No Model.)
P. W. PECKHAM.
EDUCATIONAL DEVICE.
No. 335,837. Patented Feb. 9, 1886.
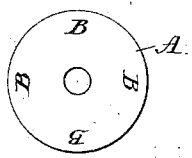
Fig. 2.
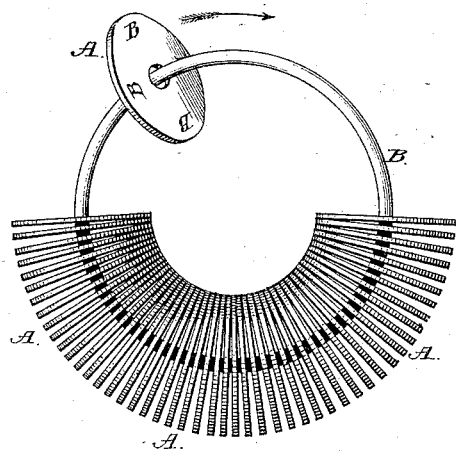
Fig. 1.
Fig. 3.
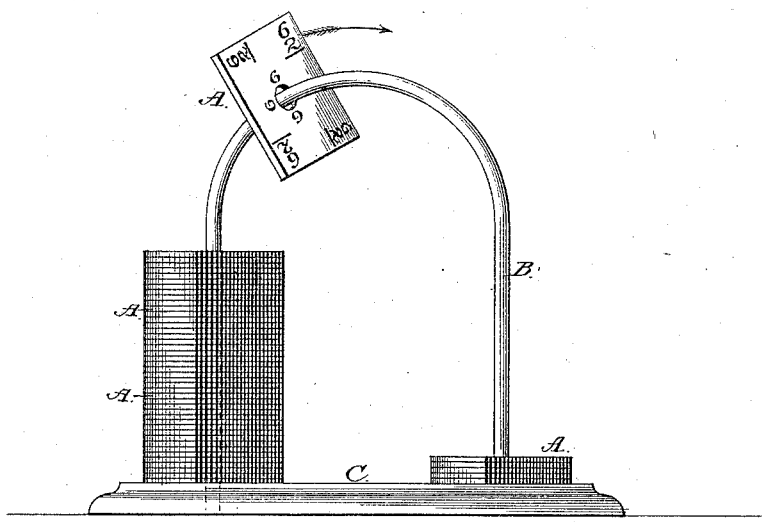
Fig. 4.
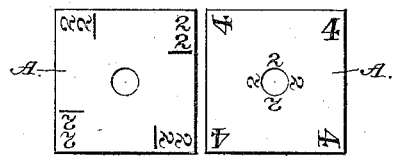
Fig. 5.
Attest:
John A. Ellis
A. B. Moon
Inventor:
Peter W. Peckham
By David A. Burr
Atty.

UNITED STATES PATENT OFFICE.

PETER WORDEN PECKHAM, OF NEW YORK, N. Y.

EDUCATIONAL DEVICE.

SPECIFICATION forming part of Letters Patent No. 335,837, dated February 9, 1886.

Application filed June 24, 1885. Serial No. 169,630. (No model.)

*To all whom it may concern:*

Be it known that I, PETER W. PECKHAM, a citizen of the United States, and a resident of the city, county, and State of New York, have invented a new and useful Improvement in Educational Devices; and I do hereby declare that the following is a full and exact description thereof, reference being had to the accompanying drawings, and to the letters of reference marked thereon, making a part of this specification.

My invention relates to an appliance for facilitating the education of children and others.

In the accompanying drawings illustrating my invention, Figure 1 is a view in perspective of one form of the device, Figs. 2 and 3 being plan views representing, respectively, the obverse and reverse sides of one of the disks or tablets employed. Fig. 4 illustrates a modification of the device, and Fig. 5 the opposite sides, respectively, of one of the disks thereon.

My invention consists of a series of disks or tablets, A A A, of any suitable thin stiff material and of any desired form in outline, which are strung upon a rod or wire, B, passing through an aperture in the center of each disk. The ends of the rod or wire may be joined together to form a ring, as shown in Fig. 1, or inserted in a stand, C, as shown in Fig. 4, or otherwise made fast to terminal plates or buttons to confine the disks thereon. The disks are thus left free both to rotate and to slide longitudinally upon the rod, so that both sides of each may be readily brought to view by sliding the selected disk apart from the remainder.

Each disk is imprinted or made to bear in any suitable manner upon the one face an interrogative suggestion or query in the form of a character, letter, word, or problem to which an answer is required, and upon its opposite face, and in a corresponding position to each interrogation, a reply thereto, also in the form of characters, letters, figures, or illustrations—as, for example, in the form of the device shown in Figs. 1, 2, and 3 the disks are represented as bearing each upon one side a letter of the alphabet, which an ignorant child will look upon interrogatively, and upon the opposite side either a symbol which will lead and assist the child to recall the letter by its name, or a repetition of the letter in a different and more striking form or color to produce the same effect, twenty-six disks being thus used to embrace the entire alphabet.

In the device as shown in Figs. 4 and 5 a problem in multiplication (viz., twice one is ?) is placed on one face and the answer (2) upon the other, the whole multiplication-table from one to twelve being included in one hundred and thirty-two of said disks. In like manner a word in one language may be placed upon one side as the interrogation and its translation in another upon the reverse as the reply, or the reverse may indicate the definition or afford an illustration as a response to the interrogative word on the obverse side.

In the use of the device, the attention and interest of the child or pupil being awakened or excited by exhibiting to it the interrogative side of a disk, he is afterward permitted to seek and find the reply by slipping the disk forward upon the ring or loop and reversing it.

The disks may be numbered consecutively, not only for convenience of reference, but also for the purpose of teaching the child to count as the disks are passed over on the wire or reversed, as shown.

I claim as my invention—

The within-described educational device, constructed of a series of disks or tablets strung upon a ring or loop, each bearing upon one face one or more interrogative suggestions or interrogations, and upon its reverse face one or more characters indicating the answer to the corresponding interrogation upon its obverse face, substantially in the manner and for the purpose herein set forth.

In testimony whereof I have signed my name to this specification in the presence of two subscribing witnesses.

PETER WORDEN PECKHAM.

Witnesses:
ARTHUR C. HALL,
ALBERT E. HALL.